US012466179B2

(12) United States Patent
Akazawa et al.

(10) Patent No.: US 12,466,179 B2
(45) Date of Patent: Nov. 11, 2025

(54) IMAGE FORMATION METHOD AND IMAGE FORMATION APPARATUS

(71) Applicant: BROTHER KOGYO KABUSHIKI KAISHA, Nagoya (JP)

(72) Inventors: Akira Akazawa, Nagoya (JP); Masashi Kuno, Nagoya (JP)

(73) Assignee: BROTHER KOGYO KABUSHIKI KAISHA, Nagoya (JP)

( * ) Notice: Subject to any disclaimer, the term of this patent is extended or adjusted under 35 U.S.C. 154(b) by 0 days.

(21) Appl. No.: 17/816,356

(22) Filed: Jul. 29, 2022

(65) Prior Publication Data

US 2023/0060390 A1 Mar. 2, 2023

(30) Foreign Application Priority Data

Aug. 26, 2021 (JP) ................................ 2021-137753

(51) Int. Cl.
*B41J 2/045* (2006.01)

(52) U.S. Cl.
CPC ......... *B41J 2/0451* (2013.01); *B41J 2/04581* (2013.01); *B41J 2/04588* (2013.01)

(58) Field of Classification Search
CPC ....... B41J 2/0451; B41J 2/0481; B41J 2/0488
See application file for complete search history.

(56) References Cited

U.S. PATENT DOCUMENTS 4,876,559 A * 10/1989 Nishikawa ........... B41J 2/04541 347/56
6,464,321 B1 10/2002 Nunokawa
2006/0114284 A1 6/2006 Mizes et al.
2009/0231375 A1* 9/2009 Folkins .................. B41J 2/2139 347/14
2014/0300656 A1* 10/2014 Ueshima ................ B41J 2/2146 347/12
2017/0282537 A1 10/2017 Yamashita
2017/0320322 A1* 11/2017 Kiji ...................... B41J 2/04581
(Continued)

FOREIGN PATENT DOCUMENTS

JP 2009-220571 A 10/2009
JP 2014-200970 A 10/2014
(Continued)

OTHER PUBLICATIONS

Extended European Search Report of European Patent Application No. 22186156.0, Issued Dec. 19, 2022.

*Primary Examiner* — Lam S Nguyen
(74) *Attorney, Agent, or Firm* — Baker Botts L.L.P.

(57) ABSTRACT

There is provided image formation method for forming image on medium by discharging liquid from head having nozzles arranged in first direction and actuators corresponding respectively to the nozzles. The method includes: discharging the liquid onto the medium from the nozzles by applying first voltage to the actuators while performing relative displacement between the head and the medium in second direction intersecting the first direction; and applying second voltage higher than the first voltage to actuator, of the actuators, corresponding to correction nozzle, based on information identifying discharge defect nozzle being a nozzle, of the nozzles, unable to discharge the liquid normally, the correction nozzle being a nozzle, of the nozzles, adjacent to the discharge defect nozzle in the first direction.

15 Claims, 10 Drawing Sheets

(56) References Cited

U.S. PATENT DOCUMENTS

| | | | |
|---|---|---|---|
| 2018/0072055 | A1 | 3/2018 | Kiji |
| 2019/0255838 | A1 | 8/2019 | Yamashita |
| 2019/0275791 | A1 | 9/2019 | Hirabayashi |

FOREIGN PATENT DOCUMENTS

| | | | |
|---|---|---|---|
| JP | 2017-013513 | A | 1/2017 |
| JP | 2017-177756 | A | 10/2017 |
| JP | 2019-055497 | A | 4/2019 |
| JP | 2019-059053 | A | 4/2019 |
| JP | 2020-151942 | A | 9/2020 |
| WO | 2018/101289 | A1 | 6/2018 |

* cited by examiner

IMAGE FORMATION METHOD AND IMAGE FORMATION APPARATUS

REFERENCE TO RELATED APPLICATIONS

This application claims priority from Japanese Patent Application No. 2021-137753 filed on Aug. 26, 2021. The entire content of the priority application is incorporated herein by reference.

BACKGROUND ART

An image formation method and an image formation apparatus which form an image on a medium moving relative to a head, by way of discharging liquid droplets from the head, are used. In the image formation method and the image formation apparatus of this kind, the head has a plurality of nozzles and a plurality of driver elements corresponding respectively to the plurality of nozzles. If a voltage is applied to each of the plurality of driver elements, then liquid droplets are discharged from the nozzles corresponding to those driver elements.

In this context, if any of the plurality of nozzles has turned a discharge defect nozzle which is unable to discharge the liquid droplets normally (for example, the nozzle has become a non-discharge nozzle or the like which does not discharge the liquid droplets), then image defection may occur with a streak-like part on the medium in the position corresponding to the discharge defect nozzle. It is known an image correction technique in which the amount of the liquid discharged by other nozzles close to the discharge defect nozzle is increased in order to suppress such image defection.

DESCRIPTION

According to a first aspect of the present disclosure, there is provided an image formation method for forming an image on a medium by discharging a liquid from a head.

The head has a plurality of nozzles arranged in a first direction and a plurality of actuators corresponding respectively to the plurality of nozzles.

The method includes:

discharging the liquid onto the medium from the plurality of nozzles by applying a first voltage to the plurality of actuators while performing relative displacement between the head and the medium in a second direction intersecting the first direction; and applying a second voltage higher than the first voltage to an actuator, of the plurality of actuators, corresponding to a correction nozzle, based on information identifying a discharge defect nozzle being a nozzle, of the plurality of nozzles, unable to discharge the liquid normally, the correction nozzle being a nozzle, of the plurality of nozzles, adjacent to the discharge defect nozzle in the first direction.

According to a second aspect of the present disclosure, there is provided an image formation apparatus configured to form an image on a medium by discharging a liquid.

The apparatus includes a head, a conveyer, and a controller.

The head has a plurality of nozzles arranged in a first direction and a plurality of actuators corresponding respectively to the plurality of nozzles.

The conveyer is configured to convey the medium in a second direction intersecting the first direction.

The controller is configured to control the head and the conveyer.

The controller is configured to execute:

discharging the liquid onto the medium from the plurality of nozzles by applying a first voltage to the plurality of actuators while performing relative displacement between the head and the medium in the second direction, and applying a second voltage higher than the first voltage to an actuator, of the plurality of actuators, corresponding to a correction nozzle, based on information identifying a discharge defect nozzle being a nozzle, of the plurality of nozzles, unable to discharge the liquid normally, the correction nozzle being a nozzle, of the plurality of nozzles, adjacent to the discharge defect nozzle in the first direction.

Figure 8A:
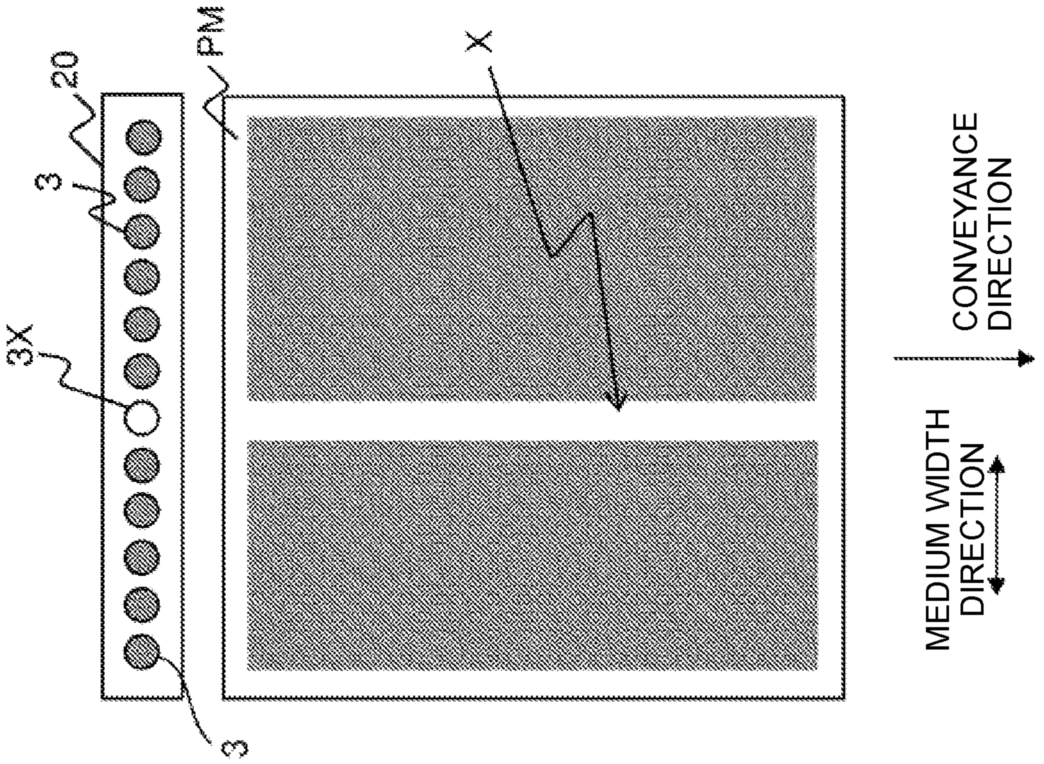
Figure 8B:
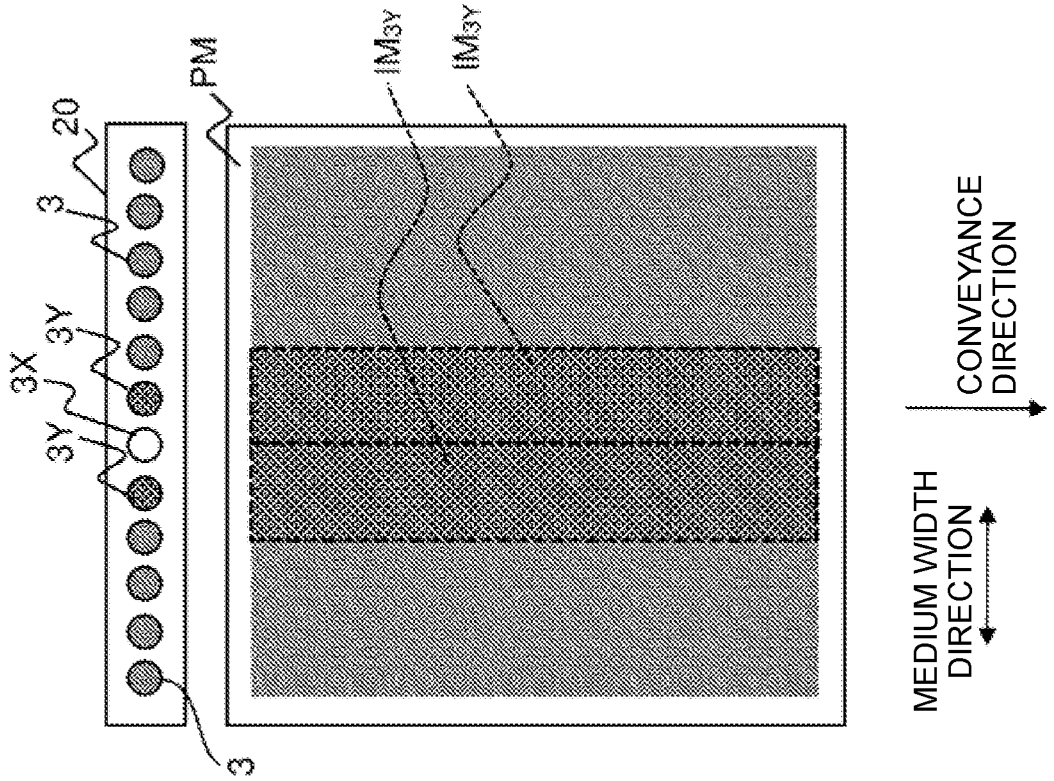

FIGS. 8A and 8B are explanatory diagrams depicting a principle for the image correction, wherein FIG. 8A depicts an aspect of a void part caused to appear in the image formed on a medium, by one of the nozzles of the head becoming a discharge defect nozzle, whereas FIG. 8B depicts an aspect of the void part caused to disappear, by increasing an ink amount discharged from the correction nozzles adjacent to the discharge defect nozzle.

Figure 9:
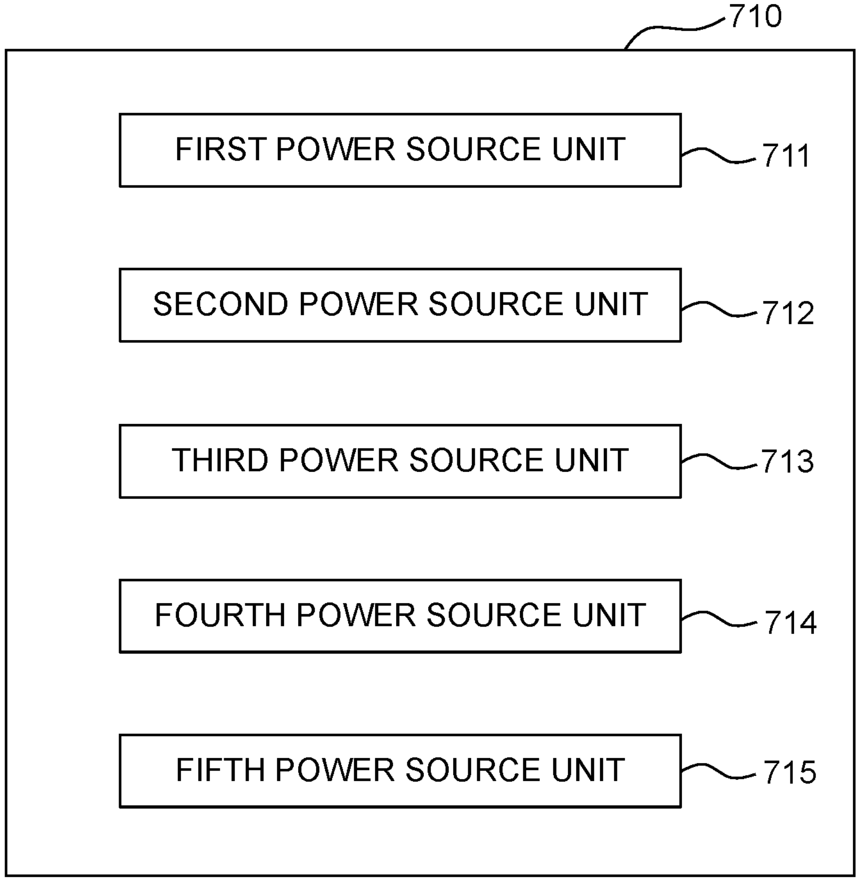

FIG. 9 is a functional block diagram of a power source for image formation with five power source units.

Figure 10:
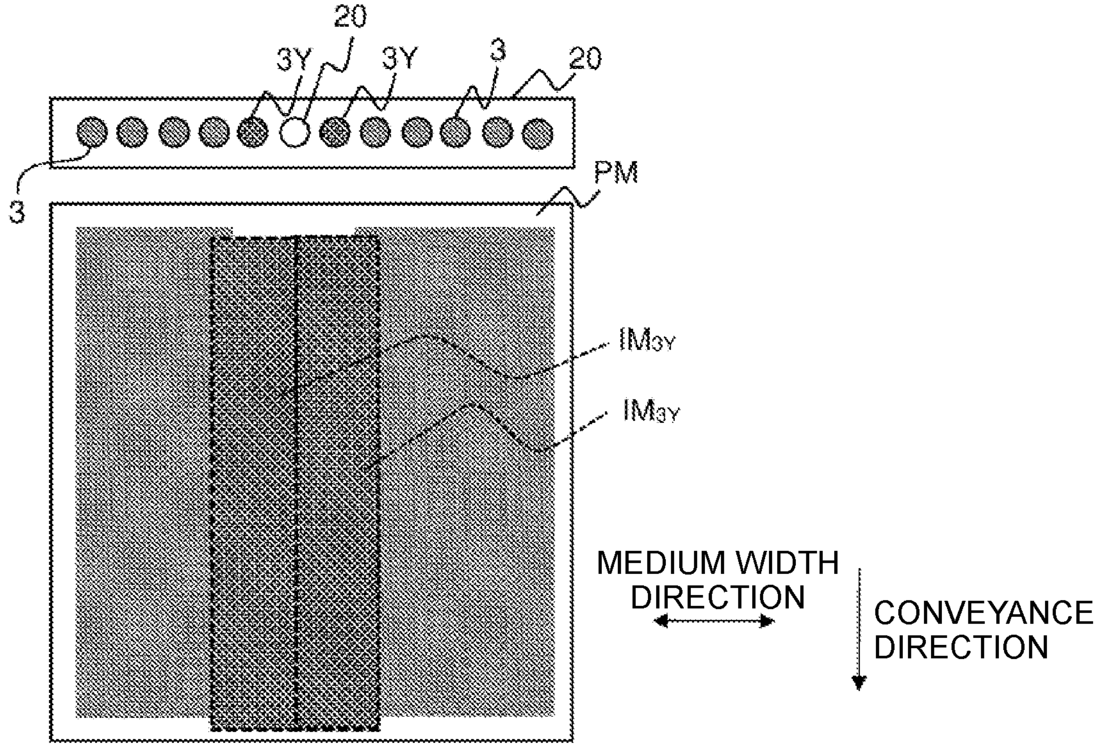

FIG. 10 is an explanatory diagram depicting an aspect of an image which is formed on the medium by an ink discharged from the correction nozzles, and which deviates in a conveyance direction due to increasing of an amount of the ink discharged from the correction nozzles.

Figure 11:
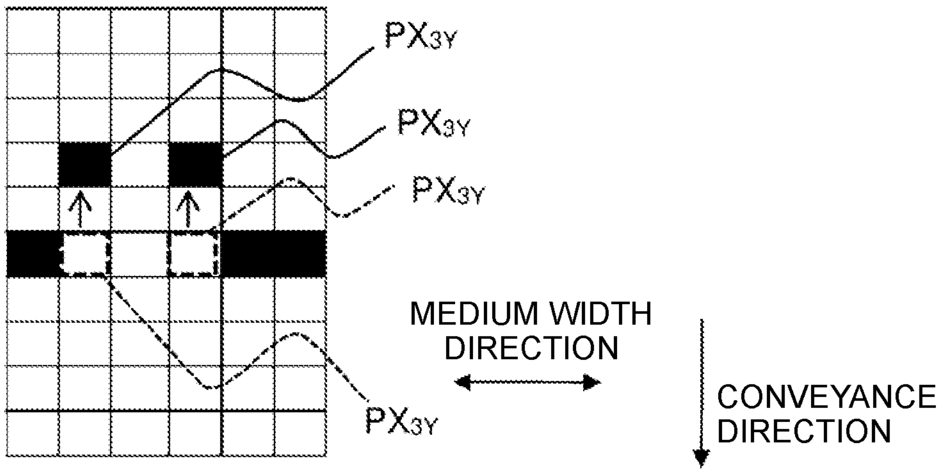

FIG. 11 is an explanatory diagram depicting an example of image data altered for adjusting a discharge timing for the correction nozzles.

With the conventional image correction technique, as a result of increasing the number of applications of pulse to the driver elements, the time for the applications of the pulse becomes longer. In other words, a discharge amount of a liquid from a nozzle is increased by extending a driving time of a driving element corresponding to the nozzle. Therefore, the image formation speed decreases due to the image correction.

An object of the present disclosure is to provide an image formation method and an image formation apparatus which are capable of correcting the image defection due to a discharge defect nozzle while suppressing decrease in the image formation speed.

An image formation method and an image formation apparatus of the disclosure are capable of correcting the image defection due to a discharge defect nozzle while suppressing decrease in the image formation speed.

<Embodiment>

Hereinbelow, referring to the accompanied drawings FIGS. 1 to 8A and 8B, an explanation will be made on a printer (an image formation apparatus) 1000 and an image formation method using the printer 1000, according to an embodiment of the present disclosure.

[The Printer 1000]

Figure 1:
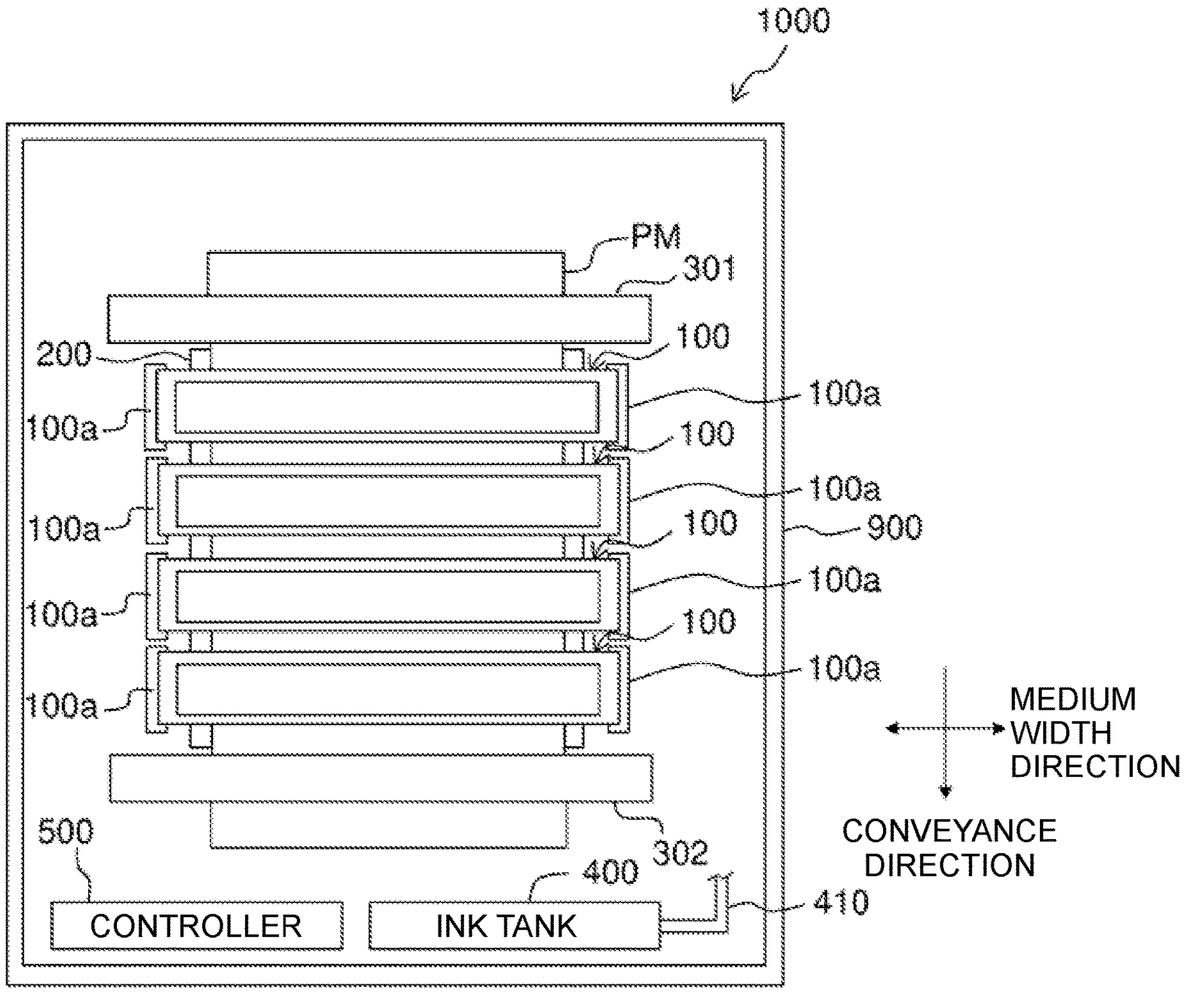
FIG. 1 is a schematic configuration diagram of a printer.

As depicted in FIG. 1, the printer 1000 primarily includes four head systems 100, a platen 200, a pair of conveyance rollers 301 and 302, an ink tank 400, a controller 500, and a casing 900 accommodating the above members.

In the following explanation, the "conveyance direction" refers to the direction in which the pair of conveyance rollers 301 and 302 are aligned, that is, the direction in which a printing medium PM is conveyed during forming of an image. Further, the "medium width direction" refers to the direction extending in a horizontal plane and being orthogonal to the conveyance direction. The medium width direction is an example of the first direction of the present invention while the conveyance direction is an example of the second direction of the present invention.

Each of the four head systems 100 is a so-called line type head (or a head bar). Each of the four head systems 100 is supported on a frame 100*a* at the two opposite ends in the medium width direction.

Figure 2:
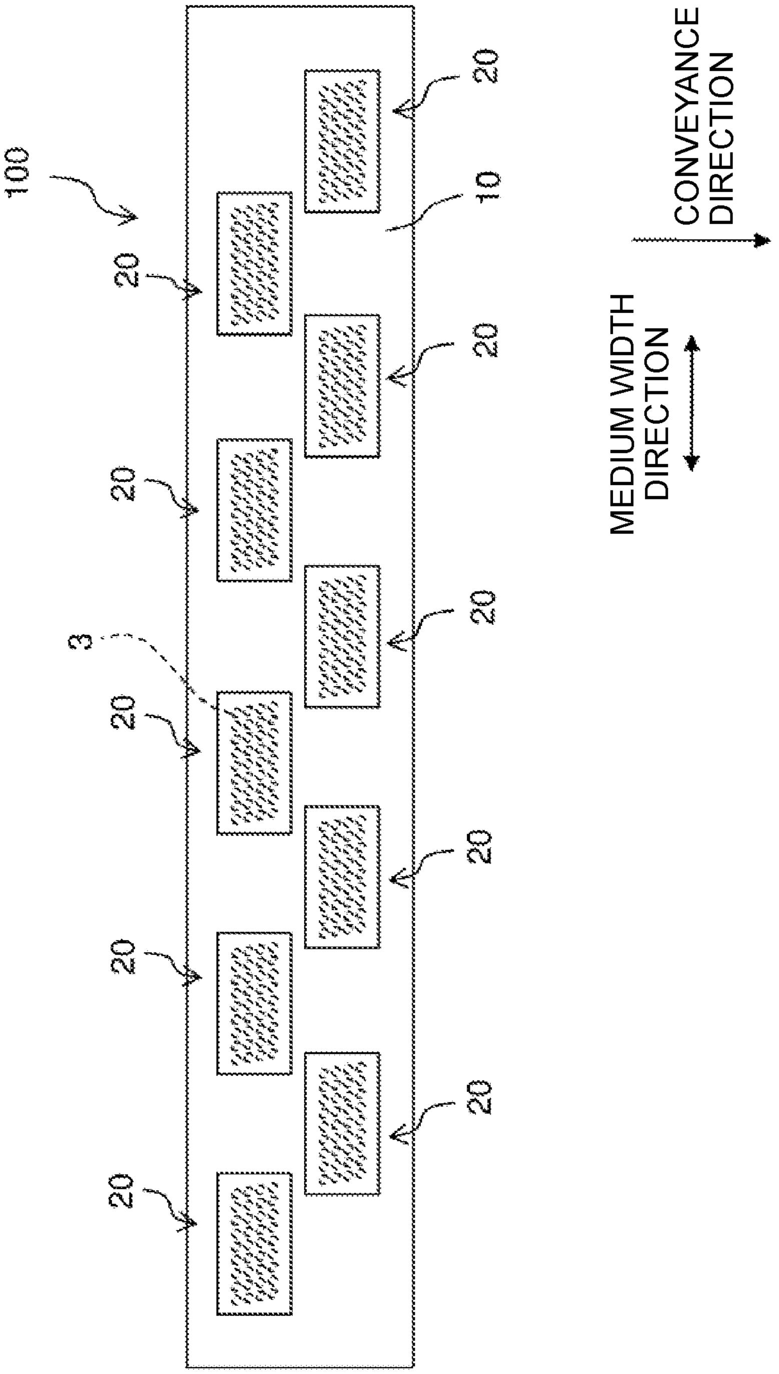
FIG. 2 is a plan view of a head system.

As depicted in FIG. 2, each of the four head systems 100 has a holder 10 shaped in the form of a rectangular plate, and ten heads 20 held on the holder 10. The frame 100*a* supports the two opposite ends of the holder 10 according to its longitudinal direction. The ten heads 20 are arranged zigzag along the medium width direction.

Figure 3:
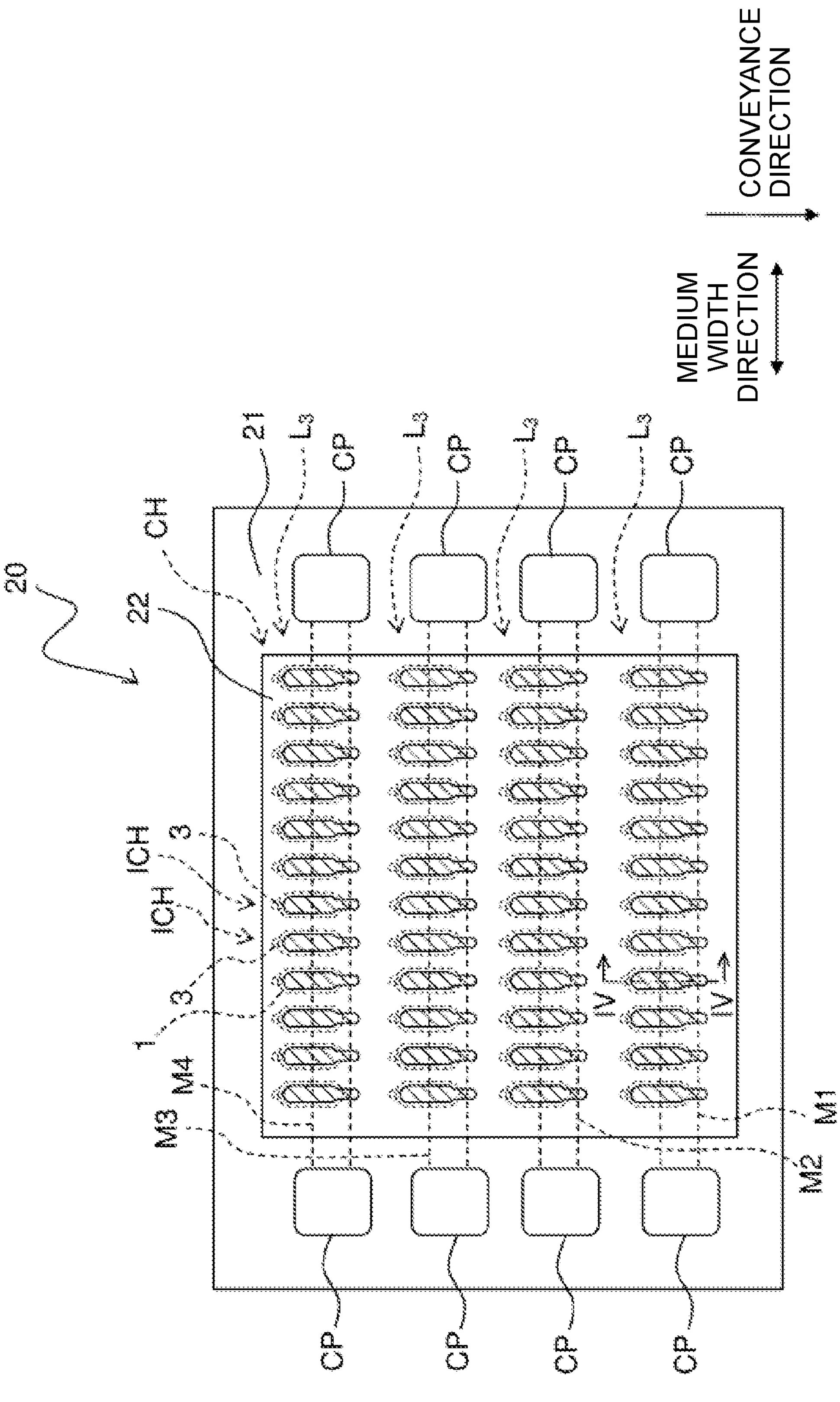
FIG. 3 is a plan view of a head.
Figure 4:
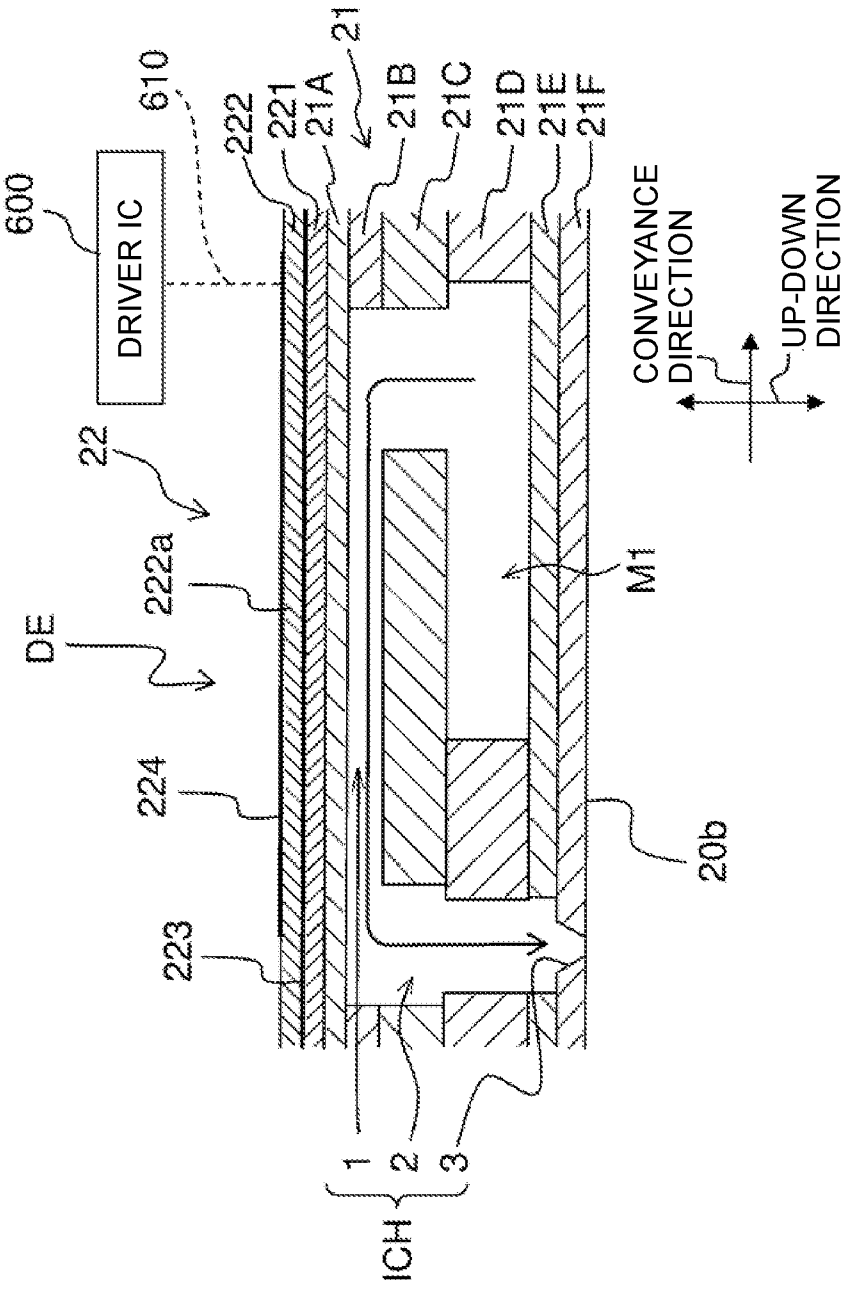
FIG. 4 is a cross section view along the line IV-IV of FIG. 3.

As depicted in FIGS. 3 and 4, each of the ten heads 20 primarily includes a channel unit 21 and a piezoelectric actuator 22.

As depicted in FIG. 4, the channel unit 21 is a structure of the layers of an ink seal film 21A, plates 21B to 21E, and a nozzle plate 21F which are layered from above in this order. Inside the channel unit 21, a channel CH (FIG. 3) is formed by way of eliminating part of each of the plates 21B to 21E and the nozzle plate 21F.

As depicted in FIGS. 3 and 4, the channel CH includes eight ink channel ports CP, four manifold channels M1, M2, M3, and M4, and forty-eight individual channels ICH. The eight ink channel ports CP includes four ink channel ports CP provided at one end of the channel unit 21 in the medium width direction and four ink channel ports CP provided at the other end of the channel unit 21 in the medium width direction. Each of the manifold channels M1 to M4 extends in the medium width direction to connect the ink channel ports CP on the side of one end and the ink channel ports CP on the side of the other end in the medium width direction. Twelve individual channels ICH are connected to each of the manifold channels M1 to M4 along the medium width direction.

Each of the forty-eight individual channels ICH includes a pressure chamber 1, a descender channel 2, and a nozzle 3, as depicted in FIG. 4.

The pressure chamber 1 is a space, for applying a pressure caused by the piezoelectric actuator 22 to the ink, formed by eliminating part of the plate 21B. The upper surface of the pressure chamber 1 is formed of the ink seal film 21A. One end of the pressure chamber 1 is in communication with one of the manifold channels M1 to M4.

The descender channel 2 is a channel formed by providing a circular through hole coaxially in each of the plates 21C to 21E, so as to cause the ink in the pressure chamber 1 to flow to the nozzle 3. The descender channel 2 extends vertically from the pressure chamber 1 to the nozzle 3.

The nozzle 3 is a minute opening formed in the nozzle plate 21F to discharge the ink toward the printing medium PM. In the lower surface of the nozzle plate 21F (that is, the lower surface 20*b* of the head 20), the forty-eight nozzles 3 form four nozzle arrays $L_3$ (FIG. 3). Each of the four nozzle arrays $L_3$ includes twelve nozzles 3 arranged or aligned in the medium width direction. The four nozzle arrays $L_3$ are arranged or aligned in the conveyance direction.

The piezoelectric actuator 22 is formed, as depicted in FIG. 4, from a first piezoelectric layer 221 provided on the upper surface of the channel unit 21, a second piezoelectric layer 222 above the first piezoelectric layer 221, a common electrode 223 interposed between the first piezoelectric layer 221 and the second piezoelectric layer 222, and a plurality of individual electrodes 224 provided on the upper surface of the second piezoelectric layer 222.

The first piezoelectric layer 221 is provided on the upper surface of the ink seal film 21A to cover all of the plurality of individual channels ICH formed in the channel unit 21. On the upper surface of the first piezoelectric layer 221, the common electrode 223 is provided to cover almost the entire area of the upper surface of the first piezoelectric layer 221, while on the upper surface of the common electrode 223, the second piezoelectric layer 222 is provided to cover the entire area of the first piezoelectric layer 221 and the common electrode 223.

The common electrode 223 is grounded through a wire (not depicted) and kept constantly at grounding potential.

Each of the plurality of individual electrodes 224 has an approximately rectangular planar shape with the conveyance direction as the longitudinal direction. The plurality of individual electrodes 224 are provided on the upper surface of the second piezoelectric layer 222 to locate respectively above the pressure chambers 1 of the plurality of individual channels ICH. Each of the plurality of individual electrodes 224 is aligned such that it is positioned above the center of the corresponding pressure chamber 1.

One driver element (actuator) DE is constructed from one individual electrode 224, a part of the first piezoelectric layer 221, a part of the second piezoelectric layer 222, and a part of the common electrode 223 positioned below that individual electrode 224. The driver elements DE are constructed one by one to correspond respectively to the numerous individual channels ICH. That is, the driver elements DE are constructed one by one to correspond respectively to the numerous pressure chambers 1 and the numerous nozzles 3.

In each of the driver elements DE, the part of the second piezoelectric layer 222 interposed between the common electrode 223 and the individual electrode 224 serves as an active portion 222*a* polarized in the thickness direction.

The individual electrode 224 of each driver element DE is connected to a driver IC 600 via a flexible circuit substrate 610.

The platen 200 is a plate-like member for supporting the printing medium PM from the opposite side to the head system 100 (from below), when the ink is discharged from the nozzles 3 of the head systems 100 toward the printing medium PM.

The pair of conveyance rollers 301 and 302 are arranged to interpose the platen 200 in the conveyance direction. The pair of conveyance rollers 301 and 302 serve as the conveyer to send the printing medium PM in the conveyance direction in a predetermined manner, when the head systems 100 are operating to form an image on the printing medium PM.

The ink tank 400 is divided into four units to allow the inks in four colors to be retained. The inks in four colors are sent to a reservoir (not depicted) via a tube 410. The reservoir is also divided into four units to allow the inks of four colors to be retained. The ink in each color sent to the reservoir is circulated between one of the four head systems 100 and the reservoir via a pipe and a pump which are not depicted.

In particular, the ink sent from the reservoir to the head systems 100 is supplied to the ink channel ports CP of the head 20 on the side of one end in the medium width direction. The ink not discharged from the nozzles 3 is discharged or drained from the ink channel ports CP of the head 20 on the side of the other end in the medium width direction and then returned to the reservoir.

Figure 5:
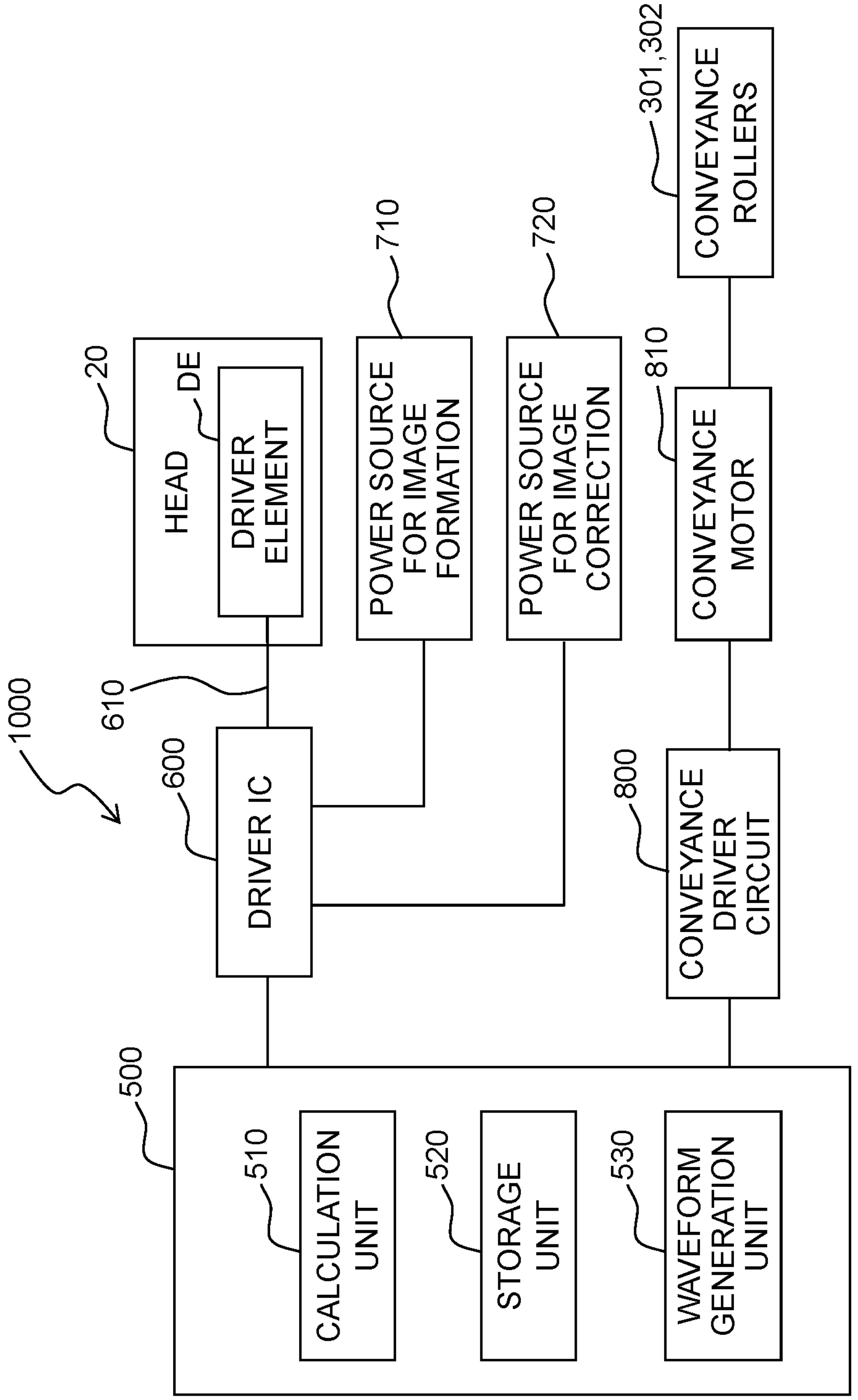
FIG. 5 is a functional block diagram depicting a configuration of the printer.

The controller 500 has, as depicted in FIG. 5, a calculation unit 510, a storage unit 520, and a waveform generation unit 530.

The calculation unit 510 carries out various calculations needed for controlling the printer 1000, and the storage unit 520 stores various data used in the printer 1000. The calculation unit 510 is constructed from integrated circuits and the like such as, for example, a processer such as a CPU or the like, an ASIC, an FPGA (Field Programmable Gate Array), and the like. The storage unit 520 is constructed from, for example, RAM, ROM, and the like.

The waveform generation unit 530 generates a pattern signal (a waveform signal such as a pulse waveform signal as one example) which indicates the timing for driving the driver elements DE of the head 20. The waveform generation unit 530 may be constructed either of a dedicated circuit or from the calculation unit 510 and the storage unit 520.

The controller 500 is connected to each of the driver elements DE of each of the heads 20 via the driver IC 600 and the flexible circuit substrate 610. The driver IC 600 is connected with a power source for image formation 710 and a power source for image correction 720. The driver IC 600 is also connected to the ground via an undepicted wire (that is, the drive IC 600 is grounded). One driver IC 600, one power source for image formation 710, and one power source for image correction 720 are provided for one head 20.

The driver IC 600 uses the power source for image formation 710 or the power source for image correction 720 to apply a driving voltage to the individual electrode 224 of each driver element DE of each head 20. The driver IC 600 also uses the connection with the ground to apply the grounding potential to the individual electrode 224 of each driver element DE of each head 20.

The power source for image formation 710 is a power circuit for applying the driving voltage to the driver elements DE. The power source for image formation 710 can be, for example, a DC/DC converter constructed from a plurality of electronic components such as an FET, inductor, resistance (impedance), electrolytic capacitor, and the like. The power source for image formation 710 may give an output voltage at about 18V to 20V for example.

The power source for image correction 720 is a power source for applying a driving voltage for image correction to the driver elements DE. As with the power source for image formation 710, the power source for image correction 720 can be a DC/DC converter constructed from a plurality of electronic components such as an FET, inductor, resistance, electrolytic capacitor, and the like. In this embodiment, the power source for image correction 720 gives an output voltage at about 21V to 23V being 3V higher than the output voltage of the power source for image formation 710.

Further, the controller 500 is connected to the conveyance rollers 301 and 302 via a conveyance driver circuit 800 and a conveyance motor 810.

[Image Formation Method]

The printer 1000 is used to carry out image formation on the printing medium PM as follows.

First, the controller 500 obtains image data (such as raster data) indicating the image to be formed on the printing medium PM, from an external device (undepicted, a PC for example). The waveform generation unit 530 of the controller 500 generates a pattern signal (a pulse waveform signal for example) for each driver element DE of each head 20 on the basis of the image data, the pattern signal indicating the timing for driving each driver element DE of each head 20. The controller 500 sends the generated pattern signal to the driver IC 600.

The driver IC 600 applies a driving voltage to the individual electrode 224 of each driver element DE, based on the pattern signal for each driver element DE received from the controller 500, at the timing designated by the pattern signal. In this process, the driver IC 600 connects each driver element DE to the power source for image formation 710, and uses the power source for image formation 710 to apply the driving voltage (the first voltage).

By virtue of this, an electric field parallel to the polarized direction is brought in the active portion 222*a* interposed between the individual electrode 224 to which the driving voltage is applied (being a potential about 18V to 20V which is the output voltage of the power source for image formation 710), and the common electrode 223 which is kept at the grounding potential. Thereby, the active portion 222*a* contracts in the horizontal direction orthogonal to the polarized direction. As a result, the ink seal film 21A above the pressure chamber 1 vibrates to apply a pressure to the ink in the pressure chamber 1 such that ink droplets are discharged from the nozzle 3 in communication with the pressure chamber 1 via the descender channel 2.

On the other hand, the controller 500 drives the conveyance motor 810 via the conveyance driver circuit 800 on the basis of the image data obtained from the external device.

In this manner, the controller 500 forms the image indicated by the image data on the printing medium PM while performing relative displacement between the heads 20 and the printing medium PM in the conveyance direction, by carrying out a recording operation of driving each driver element DE of each head 20 to discharge the ink onto the printing medium PM from each nozzle, and a conveying operation of rotating the conveyance rollers 301 and 302 via the conveyance motor 810 to send the printing medium PM in the conveyance direction.

[Image Formation Method Including Image Correction]

Next, an explanation will be made on a method for forming an image while performing image correction by using the printer 1000.

Image correction is performed for suppressing image degradation, such as voids in particular, due to discharge defects of some nozzles 3 of the heads 20. The discharge defects are, in particular, non-discharge of the ink where the ink is not discharged, discharge deviation (discharge bias) where the ink is not discharged in an appropriate direction, and the like. Foreign substances and the like attached to a nozzle 3 may give rise to such a defect. Hereinbelow, a nozzle in which a discharge defect occurs will be referred to as a “discharge defect nozzle”.

Figure 6:
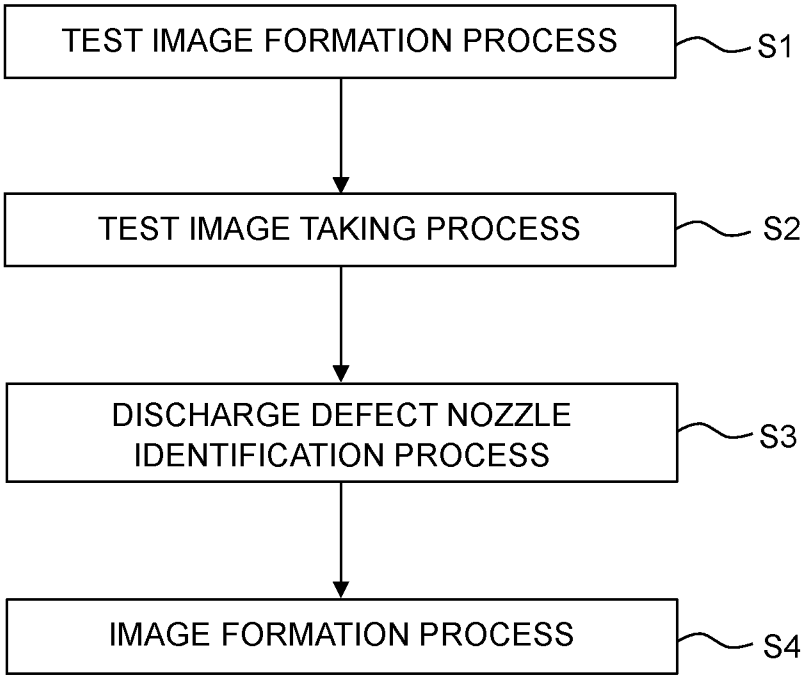
FIG. 6 is a flow chart for an image formation method including image correction.

As depicted in the flow chart of FIG. 6, the image formation method including the image correction includes a test image formation process S1, a test image taking (picking up) process S2, a discharge defect nozzle identification process S3 and an image formation process S4.

[The Test Image Formation Process S1]

Figure 7B:
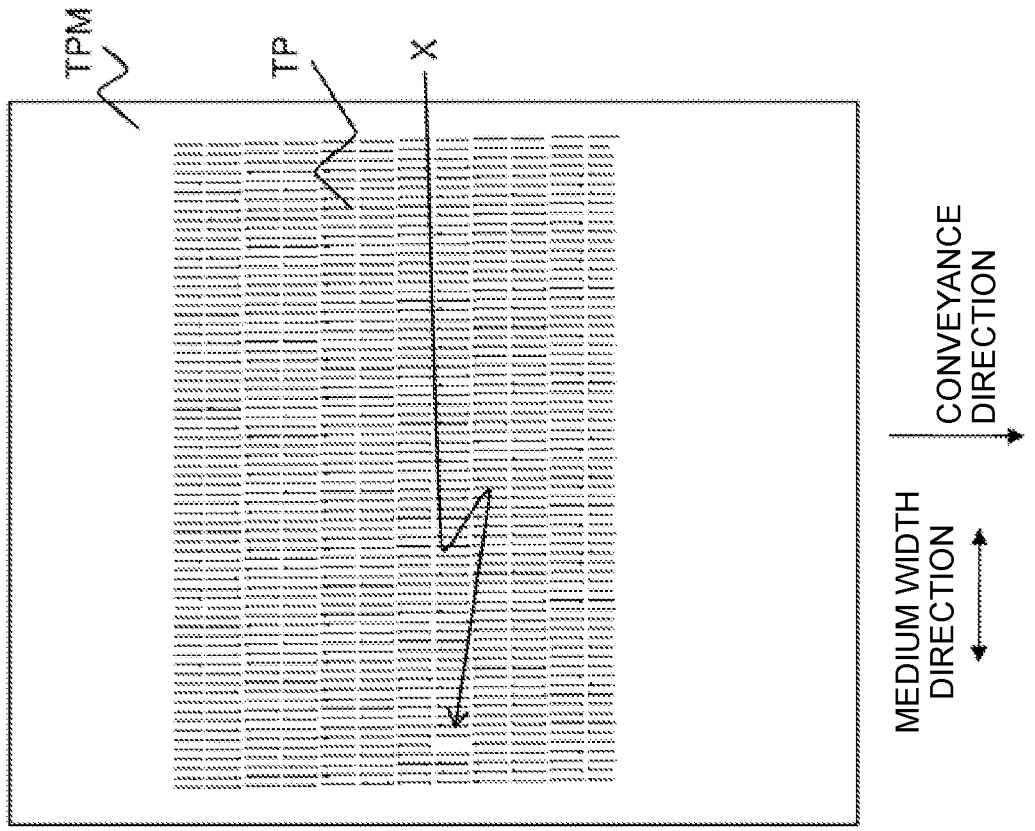
FIG. 7B is an explanatory diagram depicting an aspect of the test pattern image with a void part formed on the medium for test.
Figure 7A:
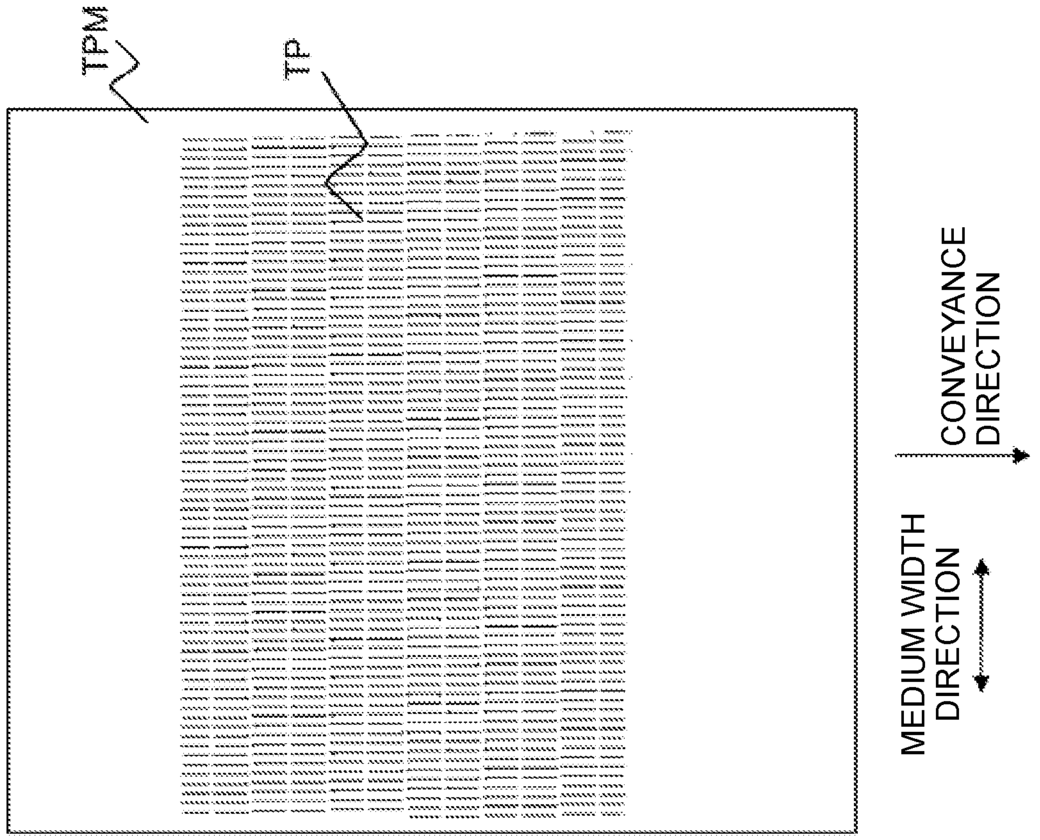
FIG. 7A is an explanatory diagram depicting an aspect of a test pattern image normally formed on a medium for test.

In the test image formation process S1, the printer 1000 is used to form an image (test image) of a test pattern TP on a medium for test TPM (FIGS. 7A and 7B). The test pattern TP may be a ruled line pattern extending in the conveyance direction but is not limited to that. The test pattern TP may be any pattern, or an image actually to be formed in the image formation process S4 may be used as the test pattern TP. The test pattern TP may include an alignment mark.

If there is no discharge defect in any of the numerous nozzles 3 of the printer 1000, then the image of the test pattern TP is formed satisfactorily on the medium for test TPM (FIG. 7A). On the other hand, if there is a discharge defect in any one of the numerous nozzles 3 of the printer 1000, then the image of the test pattern TP formed on the medium for test TPM has a linear void part X extending in a direction corresponding to the conveyance direction (FIG. 7B). As an example, the void part X having a width of about 20 μm to 40 μm may arise from the discharge defect of one nozzle 3.

[The Test Image Taking Process S2]

In the test image taking process S2, the test pattern TP formed on the medium for test TPM is taken or picked up so as to obtain an image data. In this embodiment, an image taking device of a scanning type (that is, a scanner) is used to take the image of the test pattern TP. However, the way of taking image or picking up image of the test pattern TP is not limited to the above.

[The Discharge Defect Nozzle Identification Process S3]

In the discharge defect nozzle identification process S3, the controller 500 of the printer 1000 is used to identify a discharge defect nozzle 3X (that is, a nozzle 3 in which a discharge defect occurs).

In the discharge defect nozzle identification process S3, the image (the image data) of the test pattern TP taken in the test image taking process S2 is inputted to the controller 500.

The controller 500 analyzes the inputted image of the test pattern TP and determines that there is a void part X in a position where there is a large distance between the ruled lines (vertical lines) in the test pattern TP. If there is a void part X in the image of the test pattern TP, then the nozzle 3 in the position corresponding to the void part X is identified to be the discharge defect nozzle 3X. On the other hand, if there is no void part X in the image of the test pattern TP, then it is determined that no discharge defect nozzle 3X exists.

[The Image Formation Process S4]

In the image formation process S4, the controller 500 causes the printer to form the image on the printing medium PM while correcting the void part X. The void part X is corrected as follows.

As depicted in FIG. 8A, if the discharge defect nozzle 3X is one of the nozzles arranged or aligned in the medium width direction in the head 20, then the image formed on the printing medium PM by the printer 1000 has the void part X in the position corresponding to the discharge defect nozzle 3X.

As depicted in FIG. 8B, the printer 1000 of this embodiment identifies two nozzles 3 adjacent to the discharge defect nozzle 3X in the medium width direction as correction nozzles 3Y, and increases the discharge amount of the ink from the correction nozzles 3Y. The discharge amount of the ink is increased by making the diameter of the ink droplets discharged from the correction nozzles 3Y be larger than that of the ink droplets discharged from the other nozzles 3. As a result, image $IM_{3Y}$ formed with the ink discharged from the correction nozzles 3Y are formed into the void part X, such that the void part X is corrected (or disappeared).

Note that in this embodiment and in the present invention, "a nozzle adjacent to a certain nozzle in the medium width direction" may be a nozzle which is included in the nozzle array $L_3$ including a certain nozzle and which is adjacent to the certain nozzle. Alternatively, "a nozzle adjacent to a certain nozzle in the medium width direction" may be a nozzle which is included in the nozzle array $L_3$ different from the nozzle array $L_3$ including a certain nozzle but adjacent to the certain nozzle in the medium width direction as viewing the printer 1000 as a whole.

More specifically, the printer 1000 corrects the void part X in the following manner.

First, the controller 500 identifies the correction nozzles 3Y on the basis of the discharge defect nozzle 3X identified in the discharge defect nozzle identification process S3. In this embodiment, the controller 500 identifies nozzles which are included in the same nozzle array $L_3$ as the discharge defect nozzle 3X and which are adjacent to the discharge defect nozzle 3X in the medium width direction as the correction nozzles 3Y. In this embodiment, unless the discharge defect nozzle 3X is a nozzle 3 positioned at an end in the medium width direction, two nozzles 3 interposing the discharge defect nozzle 3X therebetween in the medium width direction are identified as the correction nozzles 3Y.

Next, based on the image data indicating the image to be formed, the controller 500 generates pattern signals each indicating the driving timing for each driver element DE of each head 20, and sends the generated pattern signals to the driver IC 600.

On this occasion, the controller 500 sends a correction voltage signal along with the pattern signal to the driver IC 600 for the driver elements DE corresponding to the correction nozzles 3Y. The correction voltage signal is a signal which indicates that application of the driving voltage to the driver elements DE on the basis of the pattern signal sent along with the correction voltage signal is performed by using the power source for image correction 720.

The driver IC 600 connects the driver elements DE corresponding to the correction nozzles 3Y to the power source for image correction 720 and uses the power source for image correction 720 to apply the driving voltage (the second voltage) to the driver elements DE corresponding to the correction nozzles 3Y, on the basis of the receive of the correction voltage signal together with the pattern signal. Therefore, a driving voltage higher than a driving voltage (the first voltage) applied by the power source for image formation 710 (3V higher than the output voltage of the power source for image formation 710) is applied to the individual electrodes 224 of the driver elements DE corresponding to the correction nozzles 3Y.

By virtue of this, in the correction nozzles 3Y, contraction amount of the active portions 222a is larger compared to the case in which the power source for image formation 710 is used to apply the driving voltage, and thus a larger pressure is applied to the pressure chambers 1. As a result, a diameter of an ink droplet discharged from the correction nozzle 3Y is larger than a diameter of an ink droplets discharged from nozzles 3 different from the correction nozzle 3Y (hereinafter, referred to as "normal nozzle"). Therefore, the ink amount discharged from the correction nozzles 3Y is larger than an ink amount discharged from the normal nozzles.

Note that the controller 500 does not change the pattern of the waveform signal for the driver elements DE corresponding to the correction nozzles 3Y. That is, the waveform of the pattern signal for the driver elements DE corresponding to a certain nozzle 3 remains the same regardless of whether or not the certain nozzle 3 is identified as a correction nozzle. Therefore, the timing and the time duration for applying the driving voltage to the driver elements DE corresponding to the correction nozzles 3Y are the same as the timing and the time duration when the correction nozzles 3Y are not identified as the correction nozzles. In other words, the controller 500 increases the discharge amount (the diameter of the droplets) of the ink from the correction nozzles 3Y by only changing the magnitude of the driving voltage without changing the drive timing and the drive time duration for the driver elements DE.

Further, the controller 500 does not send the pattern signal to the driver element DE corresponding to the discharge defect nozzle 3X, and thus does not cause the discharge defect nozzle 3X to carry out the discharging operation. By virtue of this, the image quality is prevented from the degradation due to, for example, the ink discharged from the discharge defect nozzle 3X and lands in an unexpected position on the printing medium PM.

In addition, regarding the driver elements DE corresponding to the other nozzles than the discharge defect nozzle 3X and the correction nozzles 3Y (that is, the normal nozzles) the controller 500 sends, as usual, only the pattern signal to the driver IC 600. The driver IC 600 applies the driving voltage using the power source for image formation 710 at the timing designated by the pattern signal.

Effects of the printer 1000 and the image formation method according to this embodiment will be summarized as follows.

In the printer 1000 and the image formation method according to this embodiment, the driving voltage applied to the driver elements DE is raised to increase the ink amount discharged from the correction nozzles 3Y without changing the pulse waveform of the pattern signal. Therefore, the ink amount discharged from the correction nozzles 3Y can be increased without elongating the time duration of driving of the driver elements DE and, consequently, it is possible to restrain the image formation speed from the decrease due to the correction of the void part X.

In the printer 1000 and the image formation method according to this embodiment, the power source for image correction 720 different from the power source for image formation 710 is used to apply the driving voltage to the driver elements DE corresponding to the correction nozzles 3Y. Therefore, it is possible to readily and reliably apply a driving voltage, which is higher than the driving voltage applied to the driver elements DE corresponding to the normal nozzles, to the driver elements DE corresponding to the correction nozzles 3Y. Therefore, it is possible to satisfactorily carry out the image correction.

It is possible to suitably carry out the image correction while suppressing mists or satellites (a phenomenon that some of the ink droplets land in a position different from the planned landing position in addition to the planned landing position), if the output voltage of the power source for image correction 720 is raised to be 2V to 4V higher than the output voltage of the power source for image formation 710 like the above embodiment. If the difference between the output voltage of the power source for image correction 720 and the output voltage of the power source for image formation 710 is less than 2V, then the ink amount discharged from the correction nozzles 3Y is liable to be insufficient for correcting the void part X. On the other hand, if the output voltage of the power source for image correction 720 is higher than the output voltage of the power source for image formation 710 in 4V or more, then the mists or satellites are liable to arise. However, the difference between the output voltage of the power source for image correction 720 and the output voltage of the power source for image formation 710 is not limited to the above; the difference may take any value.

In the image formation method according to this embodiment, the discharge defect nozzle 3X is identified on the basis of forming an image of the test pattern TP and taking the formed image of the test pattern TP. Therefore, it is possible to identify the discharge defect nozzle 3X more correctly and to correct the image more accurately.

It is also possible to use the following modifications for the above embodiment.

The printer 1000 of the above embodiment uses a power unit, which outputs a single voltage, as the power source for image formation 710. However, the present disclosure is not limited to that.

For example, the power source for image formation 710 may have a first power source unit (first power source) 711, a second power source unit (second power source) 712, a third power source unit (third power source) 713, a fourth power source unit (fourth power source) 714, and a fifth power source unit (fifth power source) 715, the outputs of which are different from each other (FIG. 9). As an example, the output voltage of the first power source unit 711 may be 19.0V, the output voltage of the second power source unit 712 may be 19.2V, the output voltage of the third power source unit 713 may be 19.4V, the output voltage of the fourth power source unit 714 may be 19.6V, and the output voltage of the fifth power source unit 715 may be 19.8V.

The discharge feature of the numerous nozzles 3 of the printer 1000 may differ a little according to the position in the medium width direction and in the conveyance direction, affected by such as even only a small error in the diameter of the nozzles 3, some manufacturing error in the driver elements DE, a residual stress inside the heads 20 brought in manufacturing, and the like. Therefore, even if the same driving voltage is applied to all driver elements DE, it still cannot be assured that all nozzles 3 discharge the ink droplets of the same diameter.

In regard of this, by adopting a configuration in which the power source for image formation 710 has five power source units different in output voltage from each other, and applying one of the five patterns of driving voltage (that is, the output voltages 19.0V, 19.2V, 19.4V, 19.6V and 19.8V of the five power source units) to each driver element DE by using the drive IC 600, it is possible to uniform the diameters of the ink droplets discharged from driver elements DE, thereby suppressing density unevenness in the formed image.

In particular, for example, by taking an image of a solid pattern in single color formed by the printer 1000 and determining the density of the image, an aspect of density unevenness is grasped. Then, based on the grasped aspect of density unevenness, determination is made as to which one of the first power source unit 711 to the fifth power source unit 715 is used to apply the driving voltage to the driver element DE corresponding to each nozzle 3. By virtue of this, it is possible to suppress the density unevenness.

Note that it is possible to make the difference (about 2V to 4V) between the maximum output voltage (19.8V in this case) of the plurality of power source units included in the power source for image formation 710 and the output of the power source for image correction 720 be larger than the difference (0.8V at the maximum in this case) in output voltage between any two of the plurality of power source units included in the power source for image formation 710. In this manner, by making the difference between the output voltage of the power source for image correction 720 and the output voltage of the power source for image formation 710 be larger than the difference in output voltage inside the power source for image formation 710, it is possible to sufficiently enlarge the diameter of the ink droplets discharged from the correction nozzles 3Y.

According to the image formation method of the above embodiment, it is allowable to delay the timing for driving the driver elements DE corresponding to the correction nozzles 3Y (that is, the timing for the correction nozzles 3Y to discharge the ink droplets) with respect to the timing for driving the driver elements DE corresponding to the normal nozzles.

Because the power source for image correction 720 applies the higher driving voltage to the driver elements DE corresponding to the correction nozzles 3Y, the speed of the ink droplets discharged from the correction nozzles 3Y is faster than the speed of the ink droplets discharged from the normal nozzles. Therefore, as depicted in FIG. 10, images $IM_{3Y}$ formed with the ink discharged from the correction nozzles 3Y may deviate downward in the conveyance direction with respect to the image formed with the ink discharged from the normal nozzles.

In regard of this, positions at which the images $IM_{3Y}$ are formed is shifted upward in the conveyance direction by delaying the timing for driving the driver elements DE corresponding to the correction nozzles 3Y, and thus the image is formed more appropriately.

It is possible to correct the timing for driving the driver elements DE corresponding to the correction nozzles 3Y by way of, as depicted in FIG. 11 for example, shifting pixels $PX_{3Y}$ corresponding to the part drawn by the correction nozzles 3Y in an orientation corresponding to the upward side in the conveyance direction, in the image data indicating the image to be formed on the printing medium PM.

In particular for example, the controller 500 of the printer 1000 generates a pattern signal for the driver elements DE corresponding to the correction nozzles 3Y on the basis of the image data obtained from an external device, and delays the timing for driving the driver elements DE for forming the pixels $PX_{3Y}$ corresponding to the part drawn by the correction nozzles 3Y in pixel units. By virtue of this, the pixels $PX_{3Y}$ corresponding to the part drawn by the correction nozzles 3Y are shifted in the orientation corresponding to the upward side in the conveyance direction as depicted in FIG. 11 with the arrows. By virtue of this, the pattern signal indicating the timing for driving the driver elements DE for forming the pixels $PX_{3Y}$ is shifted in the time direction, so as to delay the timing for driving the driver elements DE.

In the above embodiment, the nozzles at both sides of the discharge defect nozzle 3X are identified as the correction nozzles 3Y. However, without being limited to that, only one nozzle at one side of the discharge defect nozzle 3X may be identified as the correction nozzle 3Y.

In the above embodiment, the explanation was made with one discharge defect nozzle 3X as an example. However, without being limited to that, it is also possible to correct the void part X by the same method when there is a plurality of discharge defect nozzles 3X in the medium width direction. If there is a plurality of discharge defect nozzles 3X arranged or aligned in the medium width direction, then by identifying the nozzles at the outer sides of the two opposite ends of the plurality of discharge defect nozzles 3X arranged or aligned in the medium width direction as the correction nozzles 3Y, a satisfactory correction can be performed. However, without being limited to that, it is also possible to only identify the nozzle at the outer side of one end of the plurality of discharge defect nozzles 3X arranged or aligned in the medium width direction as the correction nozzle 3Y.

In the image formation process S4 of the above embodiment, the controller 500 stops sending the pattern signal to the driver element DE corresponding to the discharge defect nozzle 3X to prevent the discharge defect nozzle 3X from discharging the ink. However, without being limited to that, the controller 500 may send the pattern signal to the driver element DE corresponding to the discharge defect nozzle 3X, and may drive the driver element DE corresponding to the discharge defect nozzle 3X.

Regarding the image formation method of the above embodiment, in the discharge defect nozzle identification process S3, the controller 500 of the printer 1000 identifies the discharge defect nozzle on the basis of the image (image data) of the test pattern TP taken in the test image taking process S2. However, without being limited to that, in particular for example, an external device other than the printer 1000 may carry out the discharge defect nozzle identification process S3. Alternatively, the test image taking process S2 may be omitted and the discharge defect nozzle may be identified by observation with human eyes or the like for example, on the basis of the image of the test pattern TP formed in the test image formation process S1. Further, the test image formation process S1 and the test image taking process S2 may be both omitted and the discharge defect nozzle may be identified on the basis of, for example, an aspect of an image formed by the printer 1000 previously. In addition, it is also possible to obtain information for identifying the discharge defect nozzle by any other method.

It should be considered that the embodiment described in the present specification is not a limited statement but is an exemplification in each and every aspect. For example, changes may be applied to the printer 1000 in terms of the number, configuration and the like of head systems 100, the number, configuration and the like of heads 20 and the number, configuration and the like of driver elements DE. At the same time, the printer 1000 is not limited regarding the number of concurrently printable colors, and thus may be configured as only capable of monochrome printing. Further, the number, arrangement and the like of individual channels ICH may also be changed in an appropriate manner. Further, it is possible to combine any of the technical characteristics, described in the embodiment and modifications, with each other.

As far as the characteristics of the present invention are maintained, the present invention is not limited to the above embodiment. The scope of the present invention includes other aspects conceivable within the technical spirit and scope of the present invention.

What is claimed is:

1. An image formation method for forming an image on a medium by discharging a liquid from a head, the head having a plurality of nozzles arranged in a first direction and a plurality of actuators corresponding respectively to the plurality of nozzles, the method comprising:

discharging the liquid onto the medium from the plurality of nozzles by applying a first voltage from a first power source to the plurality of actuators while performing relative displacement between the head and the medium in a second direction intersecting the first direction, each of the plurality of actuators having an associated waveform signal of a plurality of waveform signals;

wherein the first voltage is applied to each particular one of the plurality of actuators in accordance with a respective pattern of waveform signal, of the plurality of waveform signals, associated with the particular one of the plurality of actuators;

identifying a discharge defect nozzle, the discharge defect nozzle being a nozzle, of the plurality of nozzles, unable to discharge the liquid normally;

identifying a correction nozzle, the correction nozzle being a nozzle, of the plurality of nozzles, adjacent to the discharge defect nozzle in the first direction; and applying, from a second power source, a second voltage higher than the first voltage to a first actuator, of the plurality of actuators, corresponding to the correction nozzle, based on the respective pattern of waveform signal, of the plurality of waveform signals, associated with the first actuator, wherein the applying of the second voltage to the first actuator is performed by a driver based on reception of a correction voltage signal from a controller together with a waveform signal, of the plurality of waveform signals, associated with the first actuator, the correction voltage signal being a signal indicating the driver to perform applying of a voltage to an actuator based on a waveform signal sent together with the correction voltage signal by using the second power source.

2. The image formation method according to claim 1, wherein a diameter of a liquid droplet discharged from the correction nozzle depending on the applying of the second voltage is larger than a diameter of a liquid droplet discharged from one of the plurality of nozzles depending on the applying of the first voltage.

3. The image formation method according to claim 1, further comprising:

forming a test image on a medium for test by applying the first voltage to each of the plurality of actuators so as to discharge the liquid from the plurality of nozzles to the medium for test, while performing relative displacement between the head and the medium for test in the second direction, and obtaining information for identifying the discharge defect nozzle based on the formed test image.

4. The image formation method according to claim 3, wherein the information for identifying the discharge defect nozzle is obtained based on an image data of the formed test image.

5. The image formation method according to claim 1, wherein in a case that the first voltage is applied to the plurality of actuators, no voltage is applied to an actuator, of the plurality of actuators, corresponding to the discharge defect nozzle.

6. The image formation method according to claim 1, wherein the applying of the first voltage to the plurality of actuators is performed by connecting the plurality of actuators to the first power source, and the applying of the second voltage to the actuator corresponding to the correction nozzle is performed by connecting the actuator corresponding to the correction nozzle to the second power source different from the first power source, an output voltage of the second power source being larger than an output voltage of the first power source.

7. The image formation method according to claim 6, wherein the first power source has a plurality of power sources having output voltages different from each other, and the applying of the first voltage to the plurality of actuators is performed by connecting each of the plurality of actuators to one of the plurality of power sources.

8. The image formation method according to claim 7, wherein the difference between a maximum value of the output voltages of the plurality of power sources and the output voltage of the second power source is larger than a difference between any two of the output voltages of the plurality of power sources.

9. The image formation method according to claim 1, wherein the difference between the first voltage and the second voltage is 2V to 4V.

10. The image formation method according to claim 1, wherein the applying of the first voltage to the plurality of actuators is performed at a first timing, and the applying of the second voltage to the actuator corresponding to the correction nozzle is performed at a second timing later than the first timing.

11. The image formation method according to claim 10, further comprising designating the second timing, wherein the second timing is designated by shifting a pixel corresponding to a part drawn by the correction nozzle in a direction corresponding to the second direction, in an image data indicating the image to be formed on the medium.

12. The image formation method according to claim 1, wherein:

the correction nozzle includes a first correction nozzle and a second correction nozzle, the discharge defect nozzle being interposed between the first correction nozzle and the second correction nozzle in the first direction; and the applying of the second voltage to the actuator corresponding to the correction nozzle includes applying the second voltage to an actuator corresponding to the first correction nozzle and to an actuator corresponding to the second correction nozzle.

13. The image formation method according to claim 12, wherein the discharge defect nozzle includes a plurality of nozzles adjacent to each other and arranged in the first direction.

14. The image formation method according to claim 1, wherein:

the applying of the second voltage to the actuator corresponding to the correction nozzle is performed based on a waveform signal indicating a timing for applying the second voltage; and a shape of the waveform signal is identical to a shape of a waveform signal for the correction nozzle to be used in a case that the correction nozzle was not identified as a correction nozzle.

15. An image formation apparatus configured to form an image on a medium by discharging a liquid, the apparatus comprising:

a head having a plurality of nozzles arranged in a first direction and a plurality of actuators corresponding respectively to the plurality of nozzles;

a conveyer configured to convey the medium in a second direction intersecting the first direction; and a controller configured to control the head and the conveyer, wherein the controller is configured to execute:

discharging the liquid onto the medium from the plurality of nozzles by applying a first voltage from a first power source to the plurality of actuators while performing relative displacement between the head and the medium in the second direction, each of the plurality of actuators having an associated waveform signal of a plurality of waveform signals;

wherein the first voltage is applied to each particular one of the plurality of actuators in accordance with a respective pattern of waveform signal, of the plurality of waveform signals, associated with the particular one of the plurality of actuators;

identifying a discharge defect nozzle, the discharge defect nozzle being a nozzle, of the plurality of nozzles, unable to discharge the liquid normally;

identifying a correction nozzle, the correction nozzle being a nozzle, of the plurality of nozzles, adjacent to the discharge defect nozzle in the first direction, and applying, from a second power source, a second voltage higher than the first voltage to a first actuator, of the plurality of actuators, corresponding to the correction nozzle, based on the respective pattern of waveform signal, of the plurality of waveform signals, associated with the first actuator, wherein the applying of the second voltage to the first actuator is performed by a driver based on reception of a correction voltage signal from the controller together with a waveform signal, of the plurality of waveform signals, associated with the first actuator, the correction voltage signal being a signal indicating the driver to perform applying of a voltage to an actuator based on a waveform signal sent together with the correction voltage signal by using the second power source.

* * * * *